(12) United States Patent
Lysenko et al.

(10) Patent No.: US 7,089,319 B2
(45) Date of Patent: Aug. 8, 2006

(54) METHOD AND SYSTEM FOR INSTANTANEOUS ON-DEMAND DELIVERY OF MULTIMEDIA CONTENT OVER A COMMUNICATION NETWORK WITH AID OF CONTENT CAPTURING COMPONENT, DELIVERY-ON-DEMAND CLIENT AND DYNAMICALLY MAPPED RESOURCE LOCATOR SERVER

(76) Inventors: Anton Lysenko, 3200-2 Hillside Ave., Apt. 1407, Birmingham, AL (US) 35205; Alex Dobrianski, 304-55 E. 14th Avenue, Vancouver, BC (CA) V5T 2M4; George Lysenko, 3200-2 Hillside Ave., Birmingham, AL (US) 35205; Boris Dobrianski, Apt. 203, 1475 Fir Street, White Rock, BC (CA) V4B 4B5

( * ) Notice: Subject to any disclaimer, the term of this patent is extended or adjusted under 35 U.S.C. 154(b) by 815 days.

(21) Appl. No.: 10/248,005

(22) Filed: Dec. 9, 2002

(65) Prior Publication Data

US 2004/0111473 A1   Jun. 10, 2004

(51) Int. Cl.
*G06F 15/16* (2006.01)
*H04L 12/28* (2006.01)
(52) U.S. Cl. ............... 709/231; 709/217; 709/219; 370/389
(58) Field of Classification Search ............ 709/231, 709/217, 219; 370/389, 394; 725/110, 112, 725/135, 143; 375/240.28
See application file for complete search history.

(56) References Cited

U.S. PATENT DOCUMENTS

| | | | |
|---|---|---|---|
| 6,571,282 B1* | 5/2003 | Bowman-Amuah | 709/219 |
| 7,010,598 B1* | 3/2006 | Sitaraman et al. | 709/224 |
| 2001/0027491 A1* | 10/2001 | Terretta et al. | 709/238 |
| 2002/0068558 A1* | 6/2002 | Janik | 455/422 |
| 2002/0176418 A1* | 11/2002 | Hunt et al. | 370/389 |
| 2004/0039834 A1* | 2/2004 | Saunders et al. | 709/231 |
| 2005/0193408 A1* | 9/2005 | Sull et al. | 725/32 |

* cited by examiner

*Primary Examiner*—Frantz B. Jean

(57) ABSTRACT

The present invention provides a system for capture and instantaneous on-demand delivery of multimedia content over a communication network to a plurality of users. Incorporated into the system is a variety of advantageous features including dynamically mapped resource locator server with central control mechanism for the administration of communication channels, users access and activity, cross-platform peer-to-peer delivery-on-demand client and user programmable content capturing component. In the preferred embodiment, the multimedia information being delivered is high quality video and audio with the purpose of multi-user multimedia broadcasting and remote video monitoring over a packet switched network, such as the Internet. However, the multimedia information can also include images, text, keystrokes, user commands, computer files, data, or any other type of information that can be transmitted over any communication network.

2 Claims, 8 Drawing Sheets

| VIDEO CHANNEL NUMBER | SOURCE IP ADDRESS | VIDEO CHANNEL STATUS | ENCRYPTION | DATA1 | DATA2 | DATA3 |
|---|---|---|---|---|---|---|
| 123 | n/a | offline | n/a | patrick@acme.com | USA | n/a |
| 124 | 111.63.122.16 | online | yes | n/a | Brazil | private |
| 125 | 212.144.15.141 | online | no | swiss123@company.com | USA | fishing |
| | | | | | | |

METHOD AND SYSTEM FOR INSTANTANEOUS ON-DEMAND DELIVERY OF MULTIMEDIA CONTENT OVER A COMMUNICATION NETWORK WITH AID OF CONTENT CAPTURING COMPONENT, DELIVERY-ON-DEMAND CLIENT AND DYNAMICALLY MAPPED RESOURCE LOCATOR SERVER

CROSS-REFERENCE TO RELATED APPLICATIONS

U.S. Pat. Nos. 6,157,809; 6,151,632; 6,119,163; 6,119,144; 5,583,561

COPYRIGHT STATEMENT

Anton G. Lysenko, Alex Dobrianki, George V. Lysenko

BACKGROUND OF INVENTION

Typically, in a packet switched network such as the Internet, the information is being transmitted via a series of addressed packets, which are automatically routed from a source node (the sender) to a destination node (the receiver), passing through a plurality of intermediate nodes and routers during the process of transmission. There are several information transmission protocols that outline technical characteristics of such network transmissions. Currently, one of the most prominent and widely used network transmission protocols is TCP/IP (Transmission Control Protocol/Internet Protocol).

The TCP/IP transmissions are presently supported by almost all operating systems. Thus, most personal computers, along with many Internet-enabled devices such as handheld computers, cellular phones, pagers, and many other devices, are presently capable of engaging in information exchange based upon TCP/IP communication standard. The TCP/IP includes a network layer protocol IP intended for routing of above-mentioned information packets by network hardware equipment such as nodes, hubs, bridges, gateways and routers.

The routing is conducted by using a system of 32-bit IP addresses and routing tables. In a packet switched network such as the Internet, each connected device has its own unique IP address. A typical IP address is a four-byte (or 32-bit) number, subdivided into four 8-bit figures (also called octets) which are separated by points. Each octet is a figure carries a value from 000 to 255. Some Internet connected devices have "fixed" or "static" IP addresses, meaning their assigned IP values stay constant and never change. Other devices have "dynamic" IPs that change values upon each new network connection.

All IP addresses are further classified into five different classes (A, B, C, D, E) to facilitate the use of network devices with different degrees of interconnectivity. Thus, all intermediary Internet nodes (routers) maintain constant connection between each other, constantly exchanging their routing table connection information. Each information packet includes a header containing the IP addresses of the source, the destination nodes, as well as a sequence number which specifies the current packet's order in the transmission.

Because each router is concurrently connected to a plurality of networks, the information packets are being delivered according to a routing table information of intermediary routers and the source/destination IP addresses included in packets headers. Thus, the packets are transferred in a sequential fashion, one after another, by means of all intermediary routers performing the above-described routing procedure until all transmitted packets reach their corresponding destination nodes. However complex this TCP/IP packet transmission model may be, the Internet is designed for use by ordinary people, many of whom possess only minimal computer networking knowledge.

Thus, it becomes pivotal to supplement the very complex linking engine of Internet with user-friendly and intuitive-to-use interface. A very important step was introduction of browsing software (i.e. web browsers such as Netscape Navigator or Microsoft Internet Explorer) that allowed Internet users to request and display text and graphics, typically contained within a Hyper Text Markup Language (HTML) document also called a web page.

Another important advancement was introduction of Domain Name Service (DNS). The major role of DNS is to assign certain alphanumeric strings (also known as "web addresses" or "Uniform Resource Locators") to a registered subset of network IP addresses, thus making it more intuitive and simple for a user to effectively make use of available Internet resources.

For example, the IP address "63.71.228.67" is assigned the Uniform Resource Locator of "www.uspto.gov", which is a web page of the US Patent and Trademark Office. One of the main advantages of this arrangement is that an alphanumeric string is easier to remember because it often conveys more meaning to the end user. When accessing web pages over the Internet (i.e. "surfing the web"), the user would typically type the URL of a known web site or any other known Internet resource into a web browsing application. A web browsing application will then prompt the DNS server to convert the alphanumeric URL into an IP address. The web browsing application will then send a data request to the identified IP resource, using the IP number as a "send-to" address for its data request. Once the data request has reached the identified Internet resource, the requested information is instantly forwarded back to the receiver in the form of sequentially arranged packets. Upon the reception of transmitted packets, a web browsing application would reconstruct the transmitted resource (i.e. an HTML document) back into its original form and display it to the end user. It is important to note, however, that the function of DNS is mostly optional. For example, typing the IP address "216.32.74.52" or the alphanumeric URL "www.yahoo.com" into a web browsing application would in both cases result in the retrieval of the same Internet resource.

Thus, in many cases, the end user can access the Internet resource by interchangeably using its DNS-assigned alphanumeric URL (like "http://www.yahoo.com") or its IP-based URL (like "http://216.32.74.52").

The above described connectivity model works rather well for the HTTP-based transmissions of basic HTML documents that may include text and simple graphics. However, the same conventional approach often proves ineffective for accessing the Internet resources containing rich multimedia content, such as multimedia content, including audio-visual content.

One of the difficulties is that by nature, audio and video media files are very large, and usually take very long time to completely download. Even with currently known data compression techniques, transmitting these files over the Internet often proves difficult taking into account the limited bandwidth (i.e. the Internet connection throughput capability) available to many Internet users.

Thus, there is a need for a method of multimedia content transmission where end-users can avoid downloading the entire multimedia file before being able to play it. Another difficulty arises when the user attempts to make his or her audio-visual content available for online access and/or viewing by other Internet users. One part of this problem is that, in most cases, to make audio and/or video files available online, the above mentioned files must first be copied to a third-party Web server and then somehow linked to or published on a web page or any other Internet resource in order to make these files visible to a web browsing application. This time consuming process of copying large multimedia files over a limited bandwidth impedes the immediacy of multimedia content sharing. It makes the task of real-time multimedia content sharing (i.e. real-time audio-visual communications) virtually impossible.

Thus, there is a need for a method of multimedia content transmission where end-users can instantly share multimedia content without having to upload large multimedia files onto third party web servers. Yet another aspect of this problem is that in order for a multimedia file to be visible to a web browsing application, the file must be compatible with the particular web browsing application in use.

Currently, there is a growing number of proprietary multimedia file types that are not instantly compatible with a generic web browsing application. Many of these proprietary file types require download and installation of additional third-party applications (i.e. "viewers", "players", and "plugins") which often complicate the process of online multimedia sharing even further.

Thus, there is a strong need for a method of multimedia content transmission where users can share multimedia content in a manner instantly compatible with any generic web browsing application. A typical Internet user is accustomed to a near-immediate information availability while using web browsing applications.

However, it has been found that real-time, immediate response multimedia applications are very resource-intensive to implement. For that reason, real-time audio-visual applications have traditionally been implemented on proprietary and expensive high-bandwidth networks that are capable of supporting high speed data transmissions and/or multicasting techniques.

A multicasting method and apparatus is disclosed in U.S. Pat. No. 6,119,163 issued to Monteiro et al. It is proposed to implement an extensive network infrastructure containing administration server, primary servers, control servers, media servers and multicast routers with the purpose of delivery of high-quality multimedia content. However, such dedicated systems and infrastructures are very costly and not readily available to the average Internet user. In addition, the above mentioned system relies heavily on multicasting technique, whereby the information packets have been replicated and delivered to all desired recipients. However, multicasting may not be used widely due to its technical limitations.

The majority of Internet network routers do not have the capability to support the protocol, while some network segments that support multicasting often become overwhelmed by the number of packets routed through them. For these reasons, IP multicast systems are mostly commonly used in a highly selective manner and, as a result, are not readily available for public use.

Another U.S. Pat. No. 6,151,632 issued to Chaddha et al. for method and apparatus for distributed transmission of real-time multimedia information describes an information delivery system consisting of LiveStation server, recaster servers, secondary recaster servers, secondary servers and clients. Such an elaborate system is very costly and resource-intensive to implement.

Yet another U.S. Pat. No. 5,583,561 issued to Baker et al. for multi-cast digital video data server using synchronization groups describes a delivery system including a video library server, control server and video servers that deliver digital video data to Internet viewers using multi-cast synchronization groups. As mentioned before, multicasting technology and extensive distribution network described are not readily available for public use. Thus, such delivery system is only useful in a limited context.

U.S. Pat. No. 6,157,809 issued to Kambayashi for broadcasting system, broadcast receiving unit, and recording medium used in the broadcasting system describes a VOD (video-on-demand) system for one-way on-demand delivery of audio-visual information stored on a central video server. The downside of such system is that centrally positioned video server and/or network routers located on routing pathways leading to the central video server could be easily overloaded by the flow of packets, resulting in unavailability of this on-demand delivery service to some users. In practice, equivalent type distribution networks with a centrally located storage of resource-intensive data have been shown to be easily susceptible to packet traffic overload.

U.S. Pat. No. 6,119,144 issued to Fujita et al. for apparatus and method for information transfer between a video server and a general purpose computer or the like describes a system utilizing extended FTP (File Transfer Protocol) for video information transfer between a video server and a computer. The described method utilizes information transfer method which relies heavily on data transfers between a computer and a centrally located video server, on which the resource-intensive audio-visual information is stored. Such centralized system layout would make it susceptible to traffic overload often causing frequent service blackouts in a multi-client environment such as the Internet.

All of the above mentioned distribution networks are described in detail, but little or no disclosure is made of a mechanism for efficient and instantaneous exchange of real-time multimedia content between Internet users. Thus, while such systems may be useful in limited contexts, they do not provide the capabilities, instantaneous delivery and ease of use required for maximally effective online multimedia content delivery and/or exchange that could be performed by the average Internet user.

Specifically, many Internet users are interested in a two-way real-time information exchange; that is the ability to capture and broadcast multimedia content to other Internet users over the web is just as important as the ability to receive and display such content. However, none of the above mention systems provide means for a two-directional real-time multimedia content exchange between Internet users. In addition, none of the above mentioned systems addressed the issue of instant multimedia content compatibility with a generic web browsing application, which is of principal importance to the average Internet user.

The instant content compatibility significantly expands the potential audience of such content exchange to include every Internet user in the world. Hence, there is a strongly felt need for cost-effective and easy to implement real-time multimedia content sharing application capable of instantaneous cross-platform delivery of multimedia content to any web browsing application or any other Internet enabled device. Present invention discloses a method and a system designed to perform the above mentioned task.

SUMMARY OF INVENTION

Briefly, and in general terms, the present invention provides a method and system for instantaneous, real-time delivery and/or exchange of multimedia content via a packet switched network such as the Internet.

The system is comprised of a content capturing component, delivery-on-demand client and dynamically mapped resource locator server.

The content capturing component typically resides on network user's computer. Every content capturing component is assigned a permanent and unique ID (i.e. video channel number). The content capturing component is programmed to establish and manage a network connection, to request required network resources including determining the assigned network IP address.

The content capturing component is further programmed to establish a network link with the resource locator server and selectively check on availability of component updates for content capturing component and for delivery-on-demand client. If such updates exist, content capturing component is further programmed to schedule and administer the download and installation of updates.

The content capturing component is further programmed to register its unique video channel number and its current network IP address with the dynamically mapped resource locator server, changing the status of a video channel from offline to online in the server's internal back-end database.

The content capturing component is further programmed to capture and record any available multimedia input (video, audio, images, text, keystrokes, user commands, data, etc).

The content capturing component is further programmed to partition video input into a plurality of sequential video frames where each frame is marked with a unique time stamp.

The content capturing component is also programmed to partition audio input into a plurality of sequential n-second audio portions where each portion is marked with a unique time stamp.

The dynamically mapped resource locator server is programmed to compile and store an internal back-end database of video channel numbers, network IP addresses corresponding to active content capturing components, current online/offline status for each video channel number listed and optional user data.

The dynamically mapped resource locator server is further programmed to receive, place and execute search queries against its internal back-end database and retrieve listings matching search selection criteria.

The dynamically mapped resource locator server is further programmed to form IP-based URLs (Universal Resource Locators) using the content capturing component IP addresses listed in its internal back-end database, and to redirect web browsing applications to the formed URLs, connecting web browsing applications directly to a content capturing component with the assigned video channel number that was retrieved by a search query from the server's back-end database.

Content capturing component constantly monitors the network connection for incoming web browser based information requests. Once an incoming information request is detected, the content capturing component identifies the type of web browsing application in use, creates a copy of delivery-on-demand client and optimizes it for compatibility with detected web browsing application in use.

Once connected to a selected content capturing component, a web browsing application downloads a copy of modified delivery-on-demand client to Internet user's computer and/or Internet-enabled device and then displays it on Internet user's screen.

The delivery-on-demand client is programmed to place HTTP GET requests with content capturing component. Content capturing component is programmed to render and process HTTP GET requests coming from delivery-on-demand client.

The delivery-on-demand client is further programmed to establish and administer a network connection with content capturing component. The content capturing component is programmed to determine the most efficient rate of packet transmission for each connected delivery-on-demand client.

The delivery-on-demand client is programmed to request and receive IP packets containing the compressed multimedia content captured by a content capturing component.

The delivery-on-demand client is further programmed to separate and decompress the audio-visual portion of multimedia content, which was previously compressed by a content capturing component.

The delivery-on-demand client is further programmed to continuously reassemble audio and video portions from a plurality of transmitted packets and synchronize the playback of audio and video portions by means of correlating the series of time stamps embedded in audio portions to that of video frames.

The delivery-on-demand client is further programmed to playback reassembled audio-visual portion along with any other multimedia content received from a content capturing component.

The delivery-on-demand client is further programmed to detect Internet user's feedback in a form of mouse clicks, shared multimedia content portion selection, keyboard strokes and commands and forward this feedback to the content capturing component.

One aspect of the present invention is that the content capturing component provides a user interface for effortless capture of multimedia content and efficient content delivery and/or exchange.

Another aspect of the present invention is that, once cited a specific video channel number, the resource locator server connects web browsing applications directly to delivery-on-demand client in peer-to-peer fashion thus minimizing the data flow through the centrally located dynamically mapped resource locator server, maximizing the connection speed and rate of transmission.

Yet another aspect of the present invention is that the delivery-on-demand client is instantly compatible with any generic web browsing application in use.

Another aspect of the present invention is that audio-visual content is displayed by the delivery-on-demand client in a manner that is instantly compatible with a web browsing application in use.

Another aspect of the present invention is that the content capturing component is programmed to determine the most efficient rate of packet transmission for each concurrently connected delivery-on-demand client.

Other features and advantages will become apparent to those skilled in art from the following detailed description, taken in conjunction with the accompanying drawings, which illustrate, by way of example, the features of the invention.

BRIEF DESCRIPTION OF DRAWINGS

The accompanying drawings, which constitute a part of the specification, illustrate presently preferred embodiment of the invention, and together with the summary given above and the detailed description of the preferred embodiment given below, serve to illustrate and explain the principles and aspects of the invention.

FIG. 3 illustrates an internal database of video channels stored on the dynamically mapped resource locator server.

DETAILED DESCRIPTION

The present invention provides a system and method for instantaneous delivery of multimedia content over a packet switched communication network.

The multimedia content being delivered can be audio-visual information, images, animation, text, keystrokes, computer files, user commands, data or any other type of information that can be transmitted over a communication network. The multimedia content can be delivered to only one viewer or a plurality of simultaneous viewers.

Viewers access the multimedia content across a packet switched network using any generic web browsing application running on any computing platform. In the following description, for purposes of illustration, numerous specific details are set forth in order to provide a detailed explanation of the present invention.

It will be apparent to those skilled in art that the present invention may be practiced without these specific details.

Figure 1:
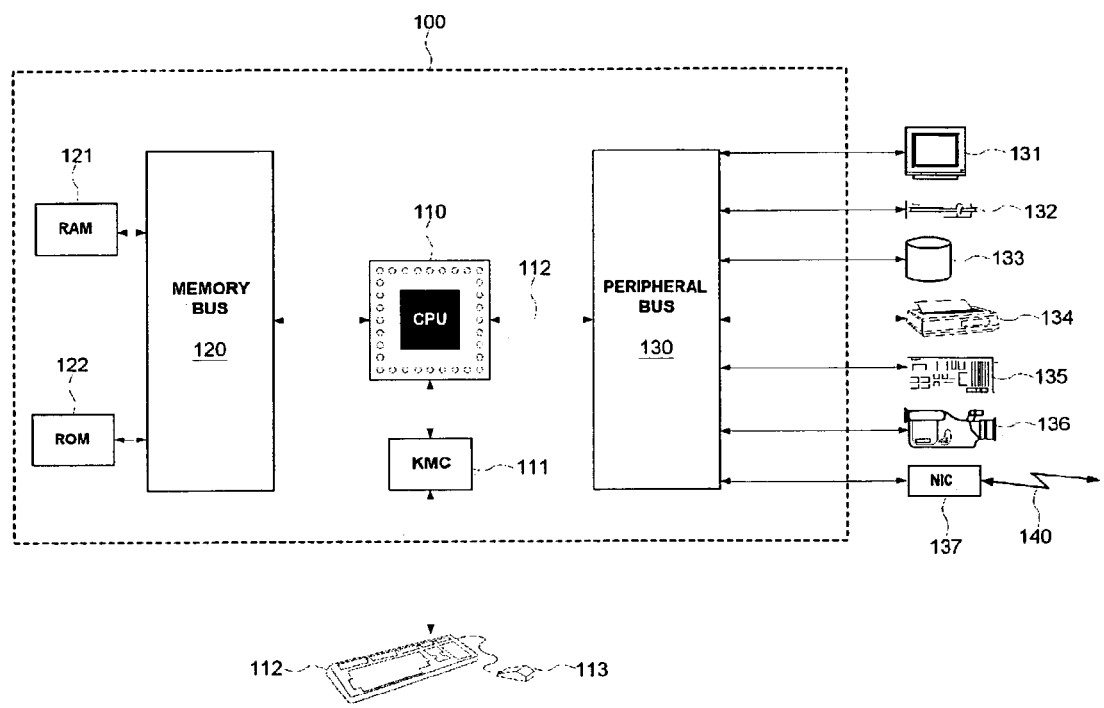
FIG. 1 is a block diagram illustrating various components of a typical personal computer system with a network access.

FIG. 1 is a block diagram illustrating various components of a typical personal computer system with a network access. As shown in FIG. 1, a wide variety of peripherals can be connected to a computer 100 via the peripheral bus 130. Many of these peripherals can be used for the purpose of capturing multimedia content such as video, sound and still images. Examples of such peripheral devices are sound (multimedia) card 135, digital or analog video camera 136, and computer display 131. If a computer has a network card 137 or any other network interface device such as a modem, and subservient Internet connection 140, the captured multimedia content can be instantly shared with and/or delivered to any Internet user who can access, view and/or receive the content using a generic web browsing application.

Figure 2A:
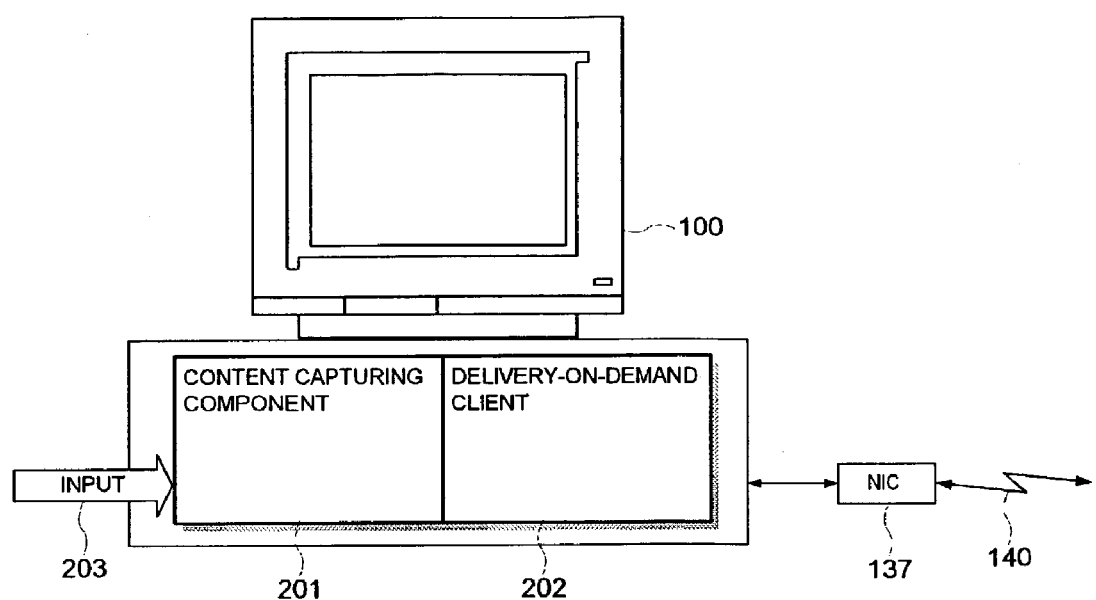
FIG. 2A is a block diagram illustrating content capturing component and delivery-on-demand client installed on a typical personal computer system with a network access.

As shown in FIG. 2A, the content capturing component 201 and delivery-on-demand client 202 both reside on the source (broadcasting) computer 100. Every distributed copy of the content capturing component is assigned a permanent and unique video channel number, in such a way that no two content capturing components have an identical video channel number assigned to both of them.

A user of the broadcasting computer 100 starts a content sharing session by initiating the content capturing component 201 and specifying a multimedia input 203 to be captured and shared with other Internet users. The content capturing component 201 then validates the presence of selected multimedia input and establishes Internet connection 140 using the network interface device 137.

Once the connection is established, the content capturing component 201 acquires and validates the current network IP address assigned to the broadcasting computer 100. Then, as shown in FIG. 4A, the broadcasting computer 100 connects to the dynamically mapped resource locator server 400 via a packet switched network 490, such as the Internet.

The packet switched network 490 is illustrated in FIGS. 4A through 4D as a net of multiple inter-nodal connections, serving as a schematic representation of the Internet, where, as described in the summary of the invention, information carrying packets are being routed between multiple network nodes.

Figure 4A:
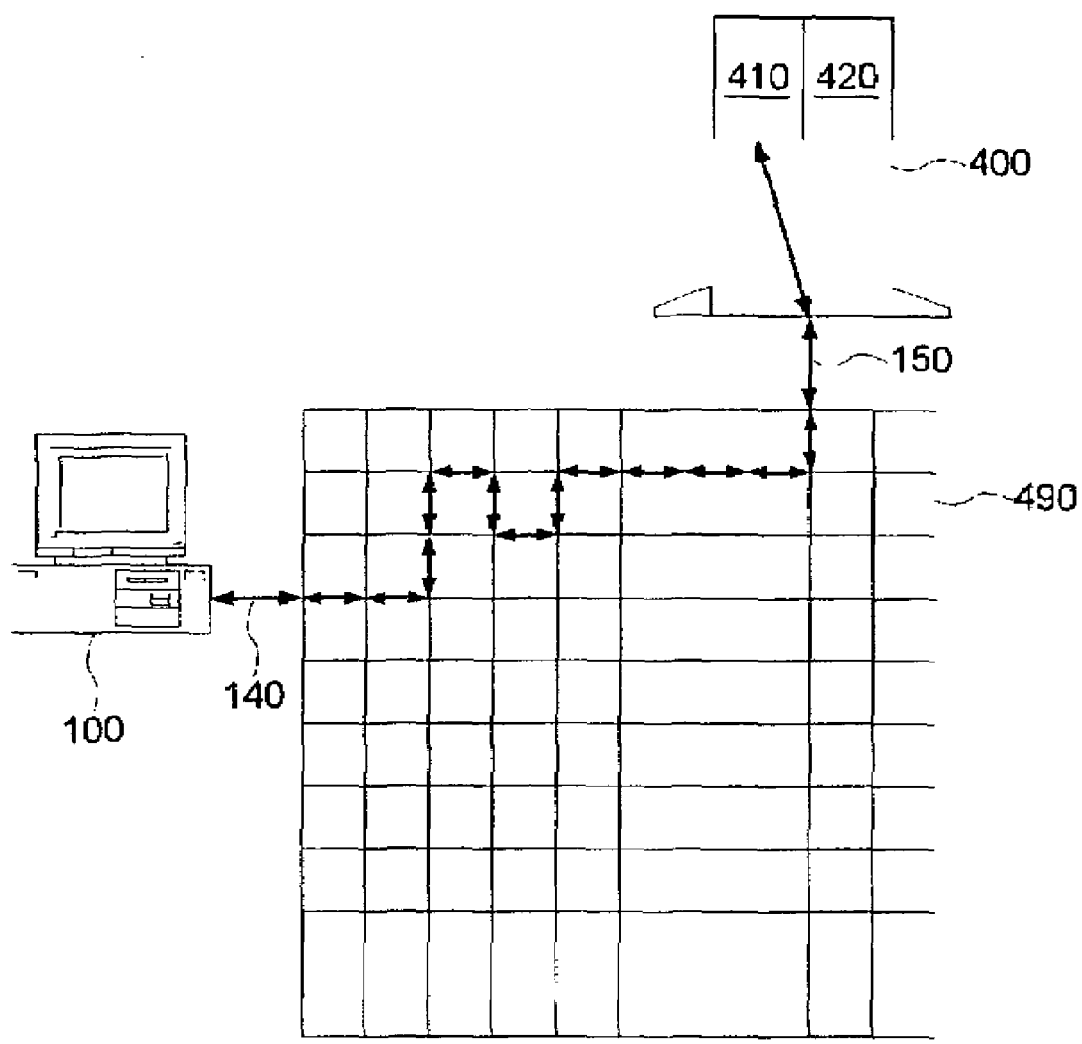
FIG. 4A illustrates the exchange of information between a content capturing component and dynamically mapped resource locator server taking place over a multi-nodal packet switched network.

The dynamically mapped resource locator server 400, shown in FIG. 4A, is constantly connected to the Internet 490 through its own permanent network connection 150. The dynamically mapped resource locator server 400 is continuously updating its back-end video channel database 410, illustrated in FIG. 3. The back-end database 410 contains listings of all video channels, the online/offline status for each video channel listed, the current IP address of each active content capturing component, the channel encryption flag for each video channel listed and other optional user identifying information such as e-mail address, geographic location and a category description for multimedia content.

One skilled in art will appreciate that some of the data elements, such as the video channel number and IP address are essential in the present embodiment, whereas other data elements such as optional user information appear in this example for illustration purposes only. The optional data elements shown in this example may appear in the database, be substituted for other optional data elements, or be excluded from the database altogether without departing from the spirit and scope of present invention.

Once a network connection with the dynamically mapped resource locator server 400 is established, the content capturing component 201 enrolls its assigned video channel number with the server, thus prompting the server to change the status of a newly enrolled video channel from offline to online in its back-end database 410. The content capturing component 201 also communicates to the server 400 its current network IP address, prompting the server to update the back-end database 410 with the current IP address of the content capturing component, linking the IP address to the video channel number corresponding to the content capturing component.

One skilled in art will appreciate that a number of user control mechanisms can be implemented on the dynamically mapped resource locator server 400, where each video channel can be screened for usage statistics. Because each content capturing component must first register with the dynamically mapped resource locator server prior to any content sharing taking place, such critical flow control elements as system usage and user activity can be easily monitored and controlled from a central location. In addition, an advantageous encryption feature can be implemented whereby the owner of content capturing component can set a password that will be required to access the multimedia content shared by that individual.

In addition to the server-based control mechanisms, a number of optional software maintenance procedures can be implemented on the content capturing component. One skilled in art will appreciate that while none of these optional steps are deemed quintessential in the context of present embodiment, they can perform an optional task of user software maintenance. One such optional step may include but not limited to an upgrade feature where the content capturing component queries the dynamically mapped resource locator server for any available software updates and/or patches applicable to the content capturing component and/or delivery-on-demand client. If such updates and/ or patches exist on the server, and the content capturing component is authorized to retrieve the above mentioned updates and/or patches, the content capturing component proceeds to download and install the available updates and/or patches on user's computer.

Other optional software maintenance procedures may include a periodic code optimization where the software code composing content capturing component and/or delivery-on-demand client is being routinely recompiled in order to optimize the system performance. Once the initial registration process with the dynamically mapped resource locator server 400 is complete, the content capturing component and a copy of delivery-on-demand client are set to work in tandem, executing a set of tasks necessary for sharing the multimedia content specified by user.

Regardless of the ongoing optional software maintenance procedures, the content sharing process can be instantly executed upon a receipt of a web-browser based access request, thus pausing any ongoing optional software maintenance procedure. All paused software maintenance procedures may fully resume upon the completion of the content sharing process. With the content capturing component constantly monitoring the Internet connection 140 for incoming web-browser based access requests from other network users, the system is idle, ready to execute the content sharing process upon the receipt of such request.

The front-end component 420 of the dynamically mapped resource locator server 400 is an active web server, linked to the back-end database 410. The front-end component 420 is programmed to host a web site, receive search inquiries placed by Internet users, execute searches according to search criteria specified by Internet users against records contained in back-end database 410, retrieve search results from the back-end database 410, display search results to Internet users in a format compatible with their web browsing applications. Once search results are narrowed down to a single video channel record which matches certain search criteria, the front-end component 420 performs a function of delivery-on-demand client address forming and redirection of a web browsing application to the formed delivery-on-demand client address.

Figure 4B:
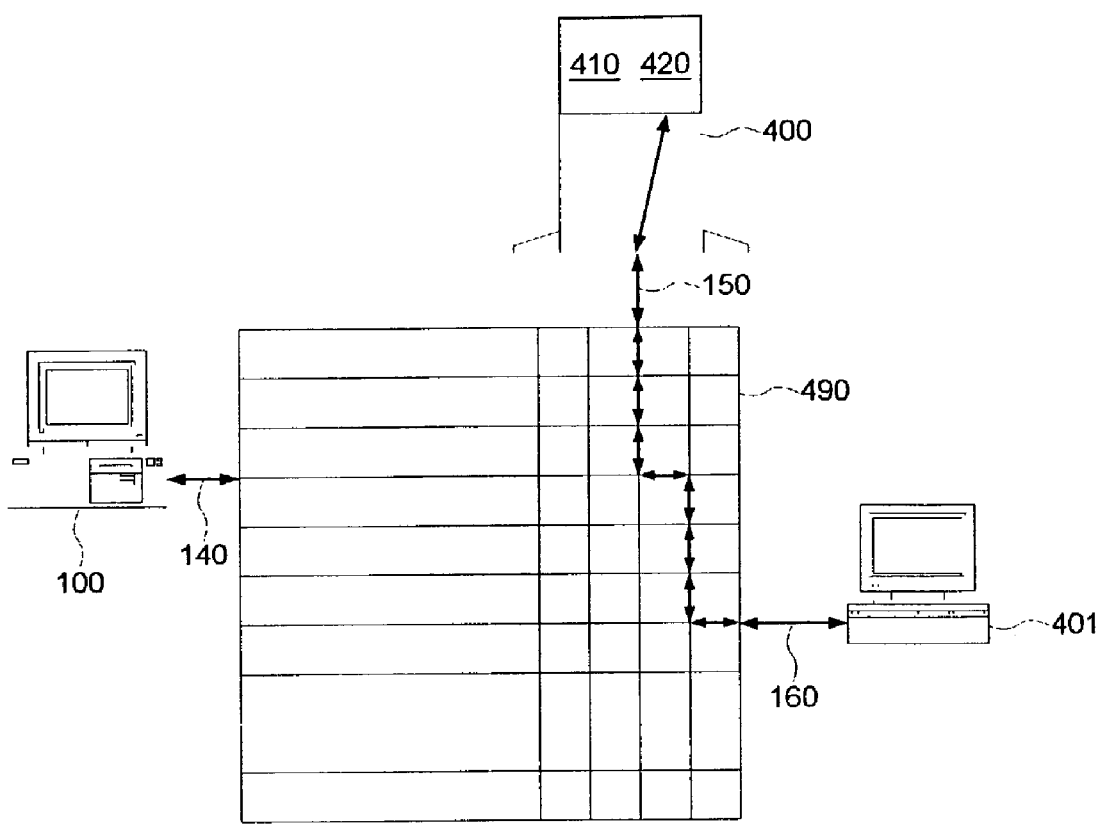
FIG. 4B illustrates a network user placing a search query on the dynamically mapped resource locator server.

This process is illustrated in FIG. 4B which depicts Internet user 401 connected to the Internet 490 via the network connection 160. Internet user 401 connects to the front-end component 420 of the dynamically mapped resource locator server 400 via the Internet 490, using a generic web browsing application. Once connected, Internet user 401 either places a web-based search request with the front-end component 420 of the dynamically mapped resource locator server 400 or specifies a valid video channel number corresponding to an active content capturing component. If Internet user places a web-based search request to display a listing of video channels according to certain selection or search criteria, the front-end component 420 queries the back-end database 410 for a listing of all video channels matching search criteria.

A listing of video channels matching the specified criteria is then displayed to Internet user 401 who may then choose to refine the search listings even further by selectively sorting the displayed entries in numerical order, by geographic location, shared content description or by using any other optional data elements recorded in the back-end database 410 in order to narrow down the listing of channels.

Figure 4C:
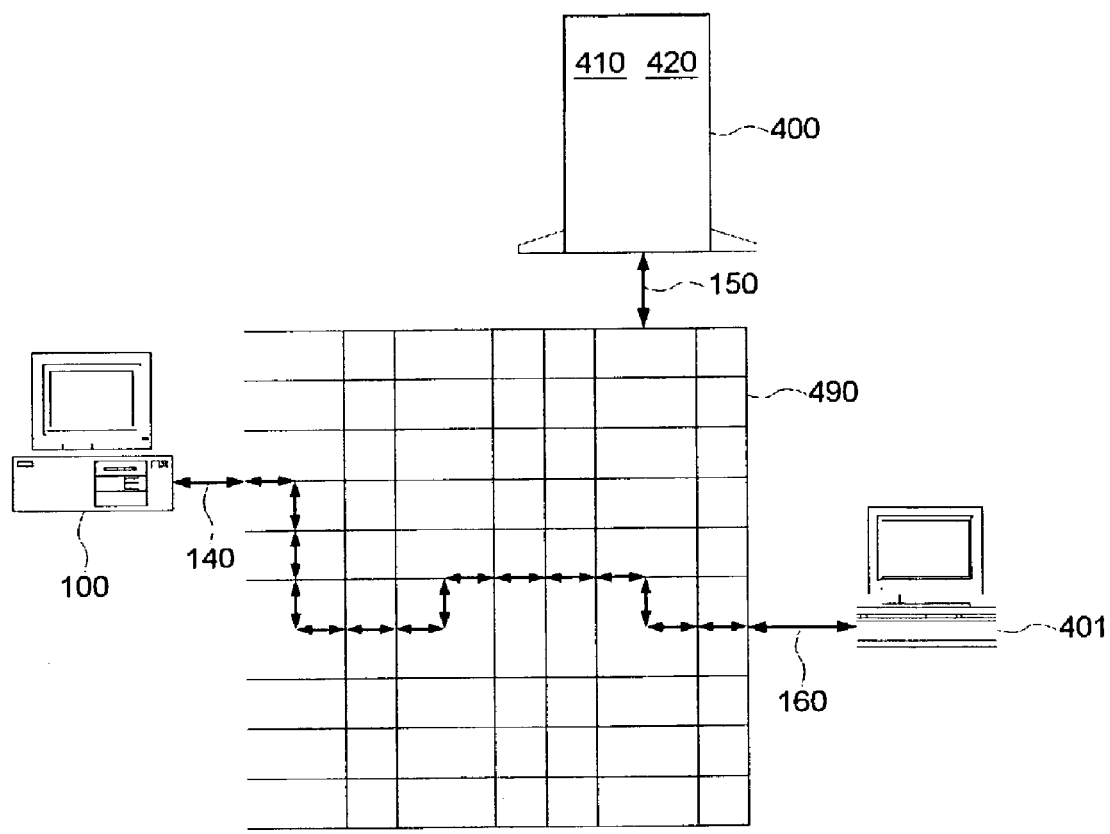
FIG. 4C illustrates a network user connecting directly to the content capturing component in peer-to-peer fashion and copying delivery-on-demand client into its web browsing application.
Figure 4D:
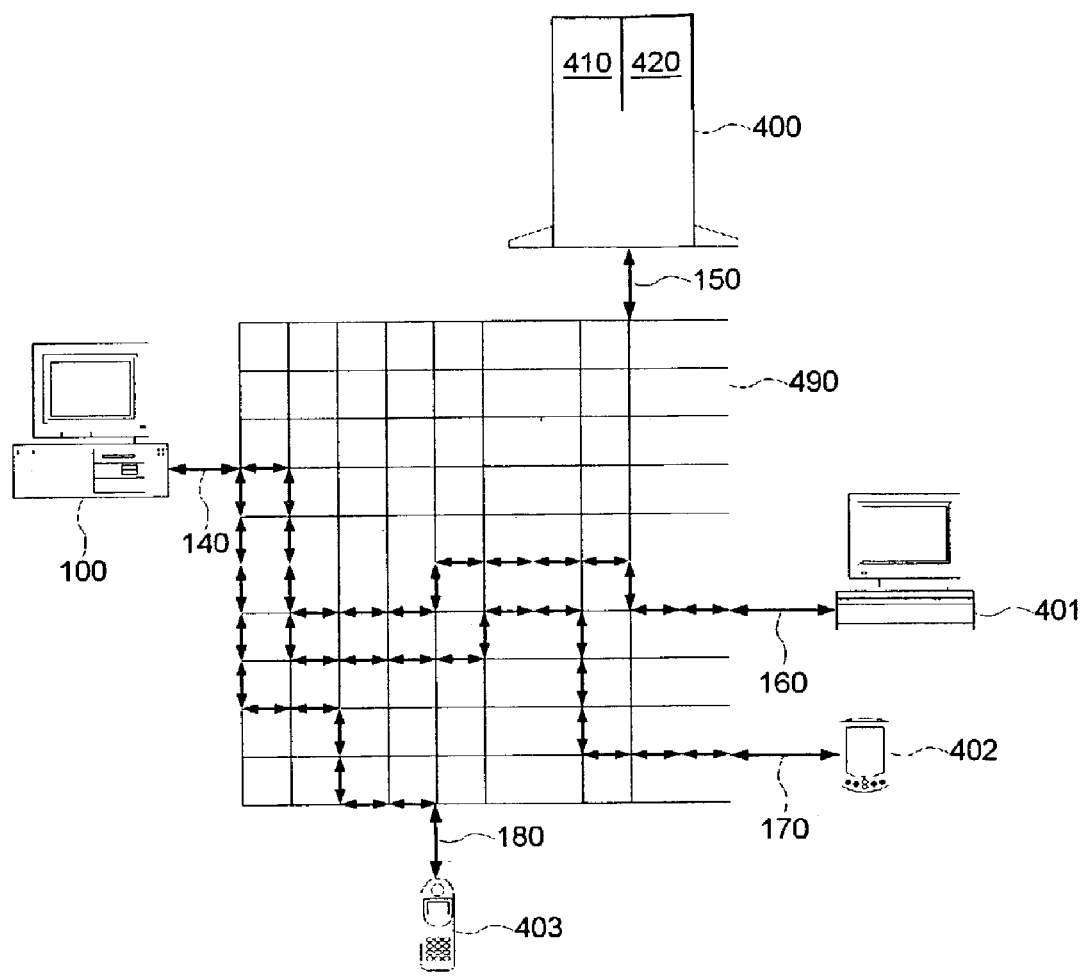
FIG. 4D illustrates a variety of different computing platforms (i.e. personal computer, handheld device, cellular phone) simultaneously connecting to the content capturing component and receiving multimedia content.

Once the final video channel selection is made and a specific video channel number is selected from a listing of video channels matching specified criteria, the front-end component 420 performs a function of delivery-on-demand client address forming and redirection of Internet user's web browsing application to the formed delivery-on-demand client address illustrated in FIG. 4C.

Those skilled in art should appreciate that the before mentioned process of searching for a specific video channel number was described in detail for illustration purposes only. Some Internet users may choose to skip the search process and specify an existing video channel number upon the initial connection to the front-end component 420. Yet some Internet users may automate the video channel selection process even further by using a "bookmark" feature of web browsing application to select a particular video channel.

A video channel selection query can also be represented in the form of HTML link which can be placed on a web page, in plain text form or by being attached to a web page element, whereby, by clicking on said link, web page visitors automatically query the back-end database on the dynamically mapped resource locator server for the availability of a specified video channel. If such specified video channel is active, web page visitors are being automatically redirected and connected directly to the broadcasting content capturing component corresponding to the specified video channel.

To illustrate the process of delivery-on-demand client address forming and redirection of Internet user's web browsing application in more detail, consider the following example. If Internet user selects video channel number 125 from a sample of back-end database records shown on FIG. 3, the front-end component 420 will retrieve the source IP address "212.144.15.141" and form a valid IP-based URL by transforming the found IP address into "http:\\ 212.144.15.141" and redirecting Internet user's web browsing application to the newly formed URL. As shown in FIG. 4C, by attempting to connect to the URL formed by the front-end component 420, web browsing application of Internet user 401 will connect to the broadcasting computer 100. Because the content capturing component 201 on the broadcasting machine 100 continuously monitors the Internet connection 140, the incoming web-based information requests will instantly initiate the content sharing process.

During the content sharing process, a modified copy of delivery-on-demand client 202, residing on the broadcasting computer 100, is downloaded by a web browsing application of Internet user 401. Upon the initial web-based information request, the content capturing component will identify the web browsing application in use and create a copy of delivery-on-demand client that is optimized for use with the identified web browsing application. Thus, the downloaded copy of delivery-on-demand client 202 is instantly compatible with every known type of generic web browsing application.

This instant compatibility of delivery-on-demand client can be achieved by programming in languages supported by the majority of web browsing applications and operating platforms. These languages may include, but not limited to, HTML, XML, Java, JavaScript, VBScript, Active X, Sharp C and others. Once downloaded to Internet user's computer, a copy of delivery-on-demand client 202 maintains active connection with the original content sharing component 201 located on broadcasting machine 100.

Figure 2B:
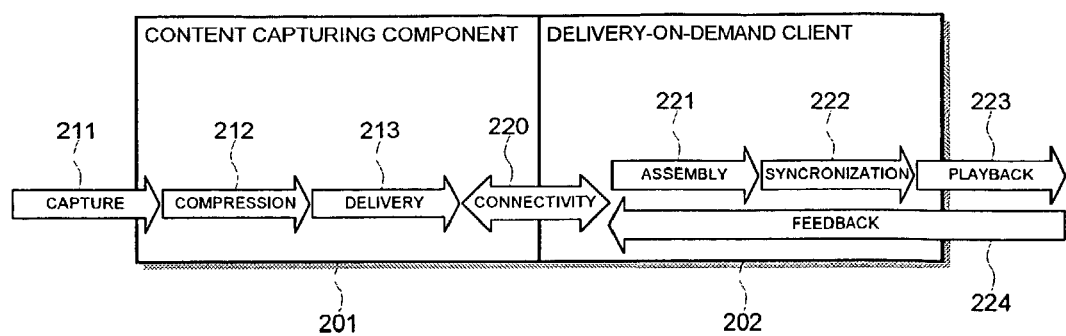
FIG. 2B illustrates the workflow of internal processes within content capturing component and delivery-on-demand client.

As illustrated in FIG. 2B, the content sharing component performs a number of procedures during the content sharing process. These procedures include content capture 211, followed by compression of audio-visual content 212 and content delivery 213. Once the specified multimedia input is captured, the audio and video information is separated from other types of captured multimedia input.

The video input is then compressed into a plurality of sequential video frames where each frame is marked with a unique time stamp. Those skilled in art should appreciate that currently there has been developed a variety of audio-visual compression techniques, each directed at providing optimum compression for a particular type of audio-visual information, content quality and purpose. Thus, depending on the required content quality and purpose, different compression techniques may be used.

Captured audio content is also compressed into a plurality of n-second audio portions where each portion is marked with a unique time stamp. A copy of delivery-on-demand client downloaded by Internet user's web browsing application running on the Internet user's computer 401 is continuously placing HTTP GET requests with the original content capturing component located on the broadcasting computer 100. The content capturing component receives, analyses, renders and processes incoming HTTP GET requests.

The content capturing component determines the optimal packet transmission rate for each active copy of delivery-on-demand client. Thus, in a multi-viewer connection environment, illustrated in FIG. 4D, each connected viewer receives shared content transmitted from a broadcasting computer at a rate optimal to that viewer's Internet connection throughput capability. As IP packets are routed and received by the copy of delivery-on-demand client, they are continuously reassembled into original portions of shared content, which is represented by the assembly process 221 illustrated in FIG. 2B. The copy of delivery-on-demand client then synchronizes the reassembled audio portions and video frames by means of correlating the series of time stamps embedded in audio portions to that of video frames.

The flow sequence of synchronization process 222 is illustrated on FIG. 2B. Once the audio-visual portion of shared content is synchronized, the copy of delivery-on-demand client replays the audio-visual portion of shared content on Internet user's screen. Other shared multimedia content such as text, keystrokes, user commands computer files, data are displayed by a copy of delivery-on-demand client alongside the audio-visual portion of the shared content. The downloaded copy of delivery-on-demand client also captures Internet user's input and/or feedback 224 and transfers it back to the source content capturing component. The source content capturing component receives the feedback and displays it to the user of the broadcasting station 100. The user of the broadcasting station 100 can stop the content sharing process at any moment. The user of the broadcasting station 100 can also program the content capturing component to initiate the content sharing process automatically at a specified date or time, for a specified duration of time, or upon a specified event.

The above described invention has been discussed in considerable detail with reference to certain preferred version thereof. However, other versions are possible. For example, in a situation where two simultaneously broadcasting computers access the content shared by each other, the advantageous two-way communication process takes place where both users can employ the above described invention for the purpose of real-time teleconferencing.

Those skilled in the art should appreciate that they can readily use the above disclosed conception and specific embodiments as a basis for designing or modifying other structures for carrying out the same purposes of the presently disclosed invention. In addition, it should be understood that various changes, substitutions and alterations can be made herein without departing from the spirit and scope of the invention as defined by the appended claims.

The invention claimed is:

1. A method for capture and on-demand delivery of multimedia content over a computer network, said method comprising the steps of:
   (a) assigning a predetermined, unique and permanent identification token to each broadcasting unit coupled to said network;
   (b) providing at least one server coupled to said network, said server programmed to store, query, display and update a finite listing of said identification token, current network IP addresses, corresponding to said broadcasting unit coupled to said network; wherein said server is programmed to monitor said network activity and receive queries originating from said network users; wherein network users place said queries by way of a web browsing application;
   (c) ascertaining and communicating changes in said IP network addresses, corresponding to said broadcasting units, to said server; wherein, in response to said changes in said IP addresses, assigned to said broadcasting units, said server updates said listing of said identification tokens and said network IP addresses, corresponding to said broadcasting units coupled to said network, to reproduce said changes in said network IP addresses, corresponding to said broadcasting units;
   (d) receiving said query placed by said network user on said server; (e)in response to receiving said query, querying said listing of said identification tokens and said IP addresses, corresponding to said broadcasting units coupled to said network, and identifying one identification token meeting requirements of said query;
   (f) retrieving said IP address, corresponding to said identification token, from said listing of said identification tokens and said IP addresses, corresponding to said broadcasting units coupled to said network;
   (g) redirecting and connecting said user''s web browsing application to said IP address, corresponding to said identification token, identified by said query, from said listing of said identification tokens and said IP addresses, corresponding to said broadcasting units coupled to said network;
   (h) in response to said user's web browsing application connection request, capturing and compressing said captured multimedia content on said broadcasting unit coupled to said network;
   Wherein said step (h) includes the steps of:
   (i) ascertaining and isolating captured video content from said captured multimedia content;

(j) partitioning said video content into a sequence of video frames; wherein each said video frame is marked with unique time stamp;
(k) ascertaining and isolating captured audio content from said captured multimedia content;
(l) partitioning said audio content into a sequence of n-second audio portions; wherein each said audio portion is marked with unique time stamp;
(m) identifying type of said user''s web application and determining optimal transmission rate for transmitting said captured and compressed multimedia content to said user''s web browsing application;
(n) delivering said captured and compressed multimedia content to said user''s web application in accordance with detected network protocol in use and said user's web application in use;
(o) receiving said captured and compressed multimedia content on said user's web browsing application;
Wherein said step (o) includes the steps of:
(p) ascertaining, isolating and decompressing said captured video content from said transmitted multimedia content;
(q) ascertaining, isolating and decompressing said captured audio content from said transmitted multimedia content;
(r) synchronizing playback on said transmitted audio content and said transmitted video content by means of correlating said unique time stamp embedded in each said frame of said transmitted video content and each said n-second portion of said transmitted audio content;
(s) assembling and displaying said transmitted multimedia content on said user's screen;
(t) capturing said user's feedback and transmitting it to said broadcasting unit;
wherein said broadcasting unit analyzes said transmitted feedback and performs functions according to programmed feedback response.

2. A distributed computer system for capture and on-demand delivery of multimedia content over a computer network, said system comprising: server means coupled to said network for storing database listing of unique and permanent identification tokens, assigned to each broadcasting unit coupled to said network, and IP addresses, corresponding to each said broadcasting unit coupled to said network; wherein said database listing is being continuously updated as IP addresses, corresponding to each said broadcasting unit coupled to said network, change in accordance to said broadcasting units network activity, said IP address changes being reflected in said database listing as said IP address changes occur; query means coupled to said server means for receiving search queries requests placed by said network users through web browsing application and executing said search queries against said database listing of said identification tokens and said IP addresses; wherein said IP addresses, corresponding to said identification tokens matching said search queries, are in return displayed to said network users as results of said search queries and used as destination addresses in said web browsing applications in process of connecting said web browsing applications to said IP addresses, returned by said search queries;content capture means executed and loaded into memory on at least one said broadcasting unit coupled to said network for capturing, compressing and delivering said captured multimedia content upon receipt of connection request placed by said web browsing application on said broadcasting unit; wherein captured video content is isolated from said captured multimedia content and partitioned into a sequence of video frames, wherein each said video frame is marked with unique time stamp, and captured audio content is isolated from said captured multimedia content and partitioned into a sequence of n-second audio portions, wherein each said audio portion is marked with unique time stamp; client delivery means downloaded and executed by said web browsing application upon initial connection to said broadcasting unit coupled to said network for reception and playback of transferred multimedia content, wherein said transferred multimedia content is transmitted directly from said broadcasting unit and received by said client delivery means, wherein upon delivery said compressed audio-visual content is isolated, decompressed, and synchronized for playback by means of correlating unique time stamps embedded in each said video frame and each said n-second audio portion.

* * * * *